US011085500B2

United States Patent
Jubik et al.

(10) Patent No.: US 11,085,500 B2
(45) Date of Patent: Aug. 10, 2021

(54) BRAKE SYSTEM HAVING SPINDLE/NUT ASSEMBLY PROVIDING SOFT STOP

(71) Applicant: MANDO CORPORATION, Gyeonggi-do (KR)

(72) Inventors: Steven Jubik, Novi, MI (US); Kyung Won Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 82 days.

(21) Appl. No.: 16/584,908

(22) Filed: Sep. 26, 2019

(65) Prior Publication Data
US 2021/0095731 A1 Apr. 1, 2021

Related U.S. Application Data

(60) Provisional application No. 62/768,035, filed on Nov. 15, 2018.

(51) Int. Cl.
| | | |
|---|---|---|
| *F16D 65/46* | (2006.01) | |
| *F16D 65/097* | (2006.01) | |
| *B60T 8/1755* | (2006.01) | |
| *F16D 65/18* | (2006.01) | |

(52) U.S. Cl.
CPC ...... *F16D 65/0972* (2013.01); *B60T 8/17555* (2013.01); *F16D 65/183* (2013.01); *F16D 65/46* (2013.01)

(58) Field of Classification Search
CPC .... F16D 65/0972; F16D 65/097; F16D 65/18; F16D 65/183; F16D 65/46; F16D 2125/40; B60T 8/17555

USPC .............................................. 188/71.1, 72.8
See application file for complete search history.

(56) References Cited

U.S. PATENT DOCUMENTS

| | | | | |
|---|---|---|---|---|
| 5,172,792 A | * | 12/1992 | Cartwright | ............ F16D 55/227 |
| | | | | 188/71.1 |
| 8,573,370 B2 | * | 11/2013 | Maehara | ............... F16D 65/183 |
| | | | | 188/72.7 |
| 10,436,269 B2 | * | 10/2019 | Demorais | ............. F16D 65/567 |
| 10,774,891 B2 | * | 9/2020 | Smith | ................... B60T 13/745 |
| 2011/0017553 A1 | * | 1/2011 | Maehara | ............... F16D 65/183 |
| | | | | 188/71.9 |
| 2011/0308898 A1 | * | 12/2011 | Shiraki | ................. F16D 65/567 |
| | | | | 188/72.4 |

(Continued)

FOREIGN PATENT DOCUMENTS

KR 10-4853760 5/2018

*Primary Examiner* — Thomas W Irvin
(74) *Attorney, Agent, or Firm* — Ladas & Parry, LLP

(57) ABSTRACT

A brake system comprises: a caliper housing having a bore formed therein; a brake piston slidably positioned in the bore of the caliper housing; and a spindle/nut assembly associated with the brake piston. The spindle/nut assembly comprises: a spindle; a spindle nut operably engaged with the spindle; and a disc type spring comprising a curved plate radially surrounding the spindle. The disc type spring is disposed between the spindle nut and the spindle to provide a resilient force between the spindle nut and the spindle. The disc type spring prevents the hard stop of the brake piston to the spindle/nut assembly and provide a soft stop. The disc type spring decreases a shock to the brake system, increases the durability of the spindle/nut assembly, and decrease the cost of the brake system.

14 Claims, 9 Drawing Sheets

(56) References Cited

U.S. PATENT DOCUMENTS

| | | | |
|---|---|---|---|
| 2014/0231189 A1* | 8/2014 | Park | F16D 65/0068 |
| | | | 188/72.3 |
| 2018/0259019 A1* | 9/2018 | Smith | B60T 13/746 |
| 2018/0298969 A1* | 10/2018 | Demorais | F16D 65/183 |
| 2020/0278000 A1* | 9/2020 | Hagiwara | B60T 13/74 |

* cited by examiner

BRAKE SYSTEM HAVING SPINDLE/NUT ASSEMBLY PROVIDING SOFT STOP

CROSS REFERENCE TO PARENT APPLICATION(S)

This application claims the benefit of U.S. Patent Application Ser. No. 62/768,035, filed on Nov. 15, 2018, entitled "RACK POSITION SENSOR; VARIABLE LAMINATIONS STACKED AXIALLY TO REDUCE THE TORQUE RIPPLE AND COGGING TORQUE OF ELECTRIC MOTORS; SPINDLE NUT SOFT STOP FOR MOC BRAKE PAD SERVICE RELEASE FUNCTION; INTERNAL GEAR UNIT BRAKE; STEPPED PISTON WITH STEEL FOOTING ASSEMBLY FOR HD TRUCK MOC; PLANETARY HARMONIC GEAR", which is all hereby incorporated herein by reference in its entirety.

BACKGROUND

Most vehicles are equipped with a brake system for slowing or stopping movement of the vehicle in a controlled manner. For example, a brake system for an automobile may include a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The brake system may be used to create a parking brake force to prevent movement of a stopped or parked vehicle.

During a service brake apply in a disc brake system, fluid is pressurized, which causes one or more brake pistons to move one or more brake pads against a brake rotor to create a clamp force. The clamp force functions to decelerate or restrict movement of the vehicle. To release the brake apply and/or to release the clamp force, the fluid is depressurized and, accordingly, the brake pistons and brake pads move away from the brake rotor. Once released, the vehicle is free to move again.

A parking brake system may utilize one or more components of the brake system to maintain the vehicle in a stopped or parked position. In modern applications, parking brake systems may be electromechanical systems. An exemplary electromechanical parking brake system includes a motor gear unit adapted to move one or more brake pistons and brake pads against a brake rotor to create a clamp force to maintain the vehicle in a stopped or parked position. To release the clamp force, the motor gear unit moves the one or more brake pistons away from the one or more brake pads.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a brake system may comprise: a caliper housing having a bore formed therein; a brake piston slidably positioned in the bore of the caliper housing; and a spindle/nut assembly associated with the brake piston, the spindle/nut assembly comprising: a spindle; a spindle nut operably engaged with the spindle; and a disc type spring comprising a curved plate radially surrounding the spindle.

The disc type spring may be disposed between the spindle nut and the spindle to provide a resilient force between the spindle nut and the spindle. In some embodiments of the present disclosure, the disc type spring may be positioned between an end of the spindle nut and a projecting part of the spindle. The projecting of the spindle may comprise a flange positioned on the spindle. The disc type spring may be configured to provide the resilient force against a movement of the spindle nut toward the spindle.

According to some exemplary embodiments of the present disclosure, the disc type spring may comprise one or more washers.

According to certain exemplary embodiments of the present disclosure, the disc type spring may comprise a Belleville: washer.

According to some exemplary embodiments of the present disclosure, the disc type spring may comprise a washer having a wave shape in an axial direction of the spindle/nut assembly.

According to certain exemplary embodiments of the present disclosure, the disc type spring may comprise a washer having a helical shape split at one point.

According to some exemplary embodiments of the present disclosure, the disc type spring may comprise a curved washer. The curved washer may be curved in an axial direction of the spindle/nut assembly.

According to certain exemplary embodiments of the present disclosure, the disc type spring may comprise a plurality of curved washers stacked on each other.

According to one embodiment of the present disclosure, the spindle may be configured to be rotatably driven and the spindle nut may be configured to be movable in a linear direction in response to a rotation movement of the spindle. According to another embodiment of the present disclosure, the spindle nut may be configured to be rotatably driven and the spindle may be configured to be movable in a linear direction in response to rotation of the spindle nut.

According to some embodiments of the present disclosure, the spindle may comprise a flange, and the disc type spring may be positioned between an end of the spindle nut facing the spindle and a surface of the flange of the spindle facing the spindle nut.

According to various embodiments of the present disclosure, the disc type spring may prevent the hard stop of the brake piston to the spindle/nut assembly and provide a soft stop. The disc type spring may decrease a shock to the brake system, increase the durability of the spindle/nut assembly, and decrease the cost of the brake system.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Various embodiments of the present disclosure are generally related to a brake system or assembly comprising a spindle/nut assembly. The brake system or assembly may be configured to slow, stop, restrict, and/or prevent movement of a vehicle. The brake system or assembly may be configured to create a brake apply. The brake apply may be a braking force (i.e., any force) that slows, stops, restricts and/or prevents rotation of a rotor, slows, stops, restricts and/or prevents movement of a vehicle, or both. Additionally, or alternatively, the brake apply may be a parking brake force (i.e., any force), which, when the vehicle is in a stopped or parked position, may restrict or prevent rotation of a rotor, restrict or prevent movement of a vehicle, or both. The brake system or assembly may be any system or assembly that performs the aforementioned functions. For example, the brake assembly may be an opposing brake system (i.e., a fixed caliper brake system), a floating brake system (i.e., a floating caliper), a parking brake assembly, or a combination thereof. The brake system or assembly may be used with any vehicle. For example, the brake system or assembly may be used with any light-duty passenger vehicle (e.g., a car, truck, sports utility vehicle, or the like), or any heavy-duty vehicle (e.g., a full size truck, van, sports utility vehicle, etc.). The brake system or assembly may include a parking brake assembly that may function to create a service brake apply, a parking brake force, or both when the vehicle is in a stopped or parked position. To function, the parking brake assembly may use or incorporate any of the elements of the brake system or assembly.

Figure 1:
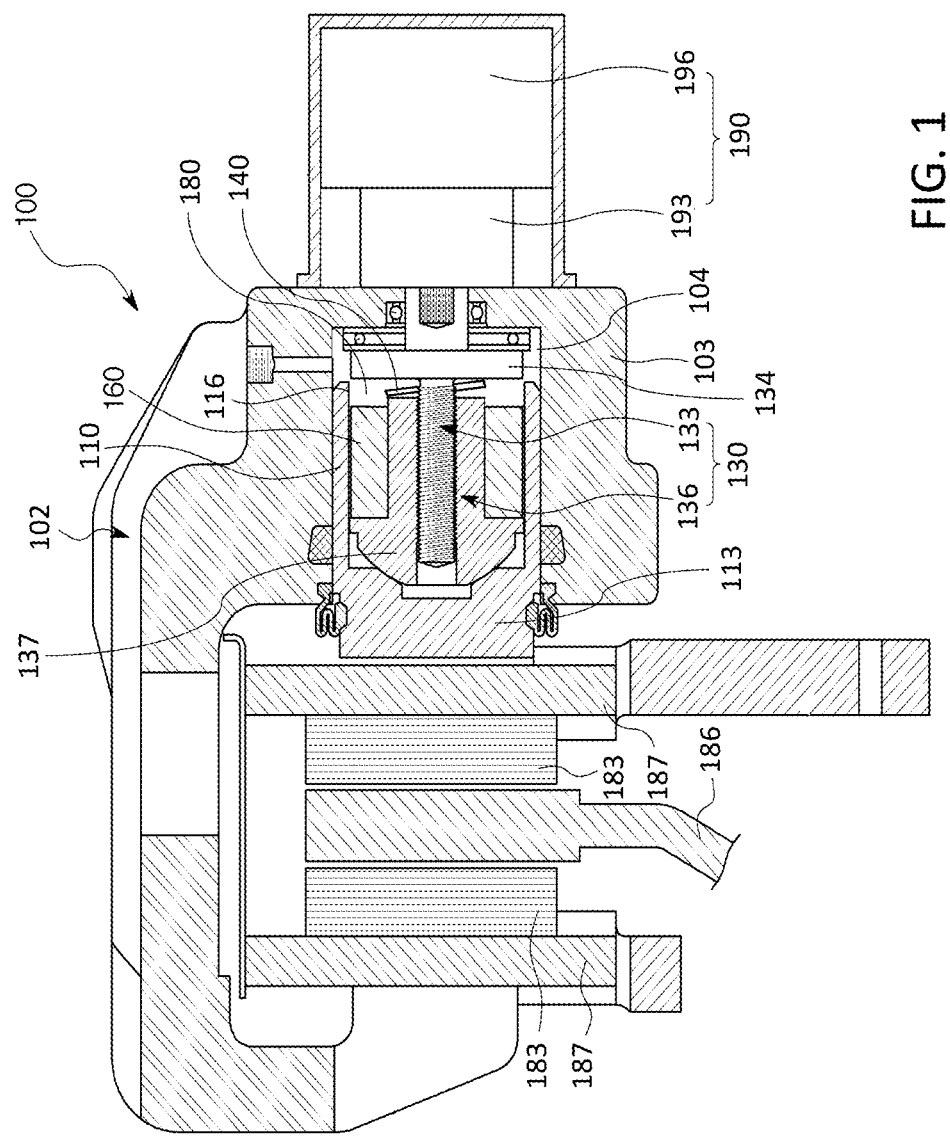
FIG. 1 is a cross-sectional view of a brake system according to an exemplary embodiment of the present disclosure.

One example of the brake system or assembly implemented as an electronic caliper brake is disclosed in Korean Patent No. 10-1853760, issued on Apr. 25, 2018, which is all hereby incorporated herein by reference in its entirety FIG. 1 is a cross-sectional view of a brake system according to an exemplary embodiment of the present disclosure.

A brake system 100 may include a brake caliper 102. The brake caliper 102 may be configured to house, contain, and/or provide for the attachment and function of any of components of a service brake assembly, a parking brake assembly, or both. For example, the brake caliper 102 may be configured to provide for the movement of one or more brake pad, or, preferably, two or more brake pads relative to a rotor. The brake caliper 102 may move during a brake apply (i.e., a floating caliper), or the brake caliper 102 may be fixed so that the brake caliper 102 does not move during a brake apply (i.e., a fixed caliper). The brake caliper 102 may be connected to any support structure of any vehicle. The brake caliper 102 may include one or more support brackets or pressure plates for engaging the one or more brake pads. In the embodiment of the present disclosure, the support brackets or pressure plates 187 are arranged around a rotor 186 so that one brake pad 183 is located on an inboard side of the rotor 186 and another brake pad 183 is located on an outboard side of the rotor 186.

The rotor or brake disc 186 may be generally circular and may extend through the brake caliper 102, may be partially surrounded by the brake caliper 102, or both. Preferably, the rotor 186 extends at least partially between the brake caliper 102 so that the friction material of one or more brake pads 183 faces an inboard side of the rotor 186 and the friction material of one or more brake pads 183 faces an outboard side of the rotor 186. During service braking operations, the friction material of one or more brake pads 183 may be moved or pushed into contact with one or more sides of the rotor 186 to create the brake apply (i.e., a braking force) so that the rotor 186, the vehicle, or both are slowed, stopped and/or restricted or are prevented from rotating or moving, respectively. During parking brake operations, the friction material of one or more brake pads 183 may be moved or pushed into contact with the one or more sides of the rotor 186 to create the brake apply (i.e. a parking brake force) so that a stopped or parked vehicle or rotor can be restricted or prevented from moving or rotating, respectively.

One or more pistons may be configured to move one or more brake pads relative to any surface of the rotor to create and/or release a brake apply. The brake apply may be any force, such as a service brake force, a parking brake force, or both. One or more pistons may move towards or away from a brake pad along a piston axis. In the embodiment of the present disclosure, the housing 103 of the brake caliper 102 may include a caliper bore 104 supporting a brake piston 110. The brake piston 110 may move in and out of the caliper bore 104. The brake piston 110 may seal the caliper bore 104 in the brake caliper 102 so that fluid is trapped within the brake caliper 102, the brake piston 110, or both. The brake piston 110 may have sufficient strength so that the brake piston 110 can be moved towards or away from the brake pads 183 via any fluid, via any mechanical device or linkage, such as a spindle nut and spindle, or a combination thereof. Preferably, during a service brake apply, the brake piston 110 is moved toward or away from the brake pads 183 via fluid pressure (i.e., brake fluid). Preferably, during a parking brake apply, the brake piston 110 is moved toward or away from the brake pads 183 via an actuator 190, such as a motor gear assembly, connected to a linkage including a spindle nut and a spindle, and/or a motor. The brake piston 110 may include a front end (such as a head 113) which may be generally flat for engaging and moving one or more brake pads 183 toward or away from the rotor 186, and a back end, which may include a pocket (such as a bore 116), for receiving fluid, for engaging a component of a mechanical linkage, such as a spindle nut, or a combination of both. The front end of the brake piston 110 may be directly or indirectly attached or coupled to the pressure plate 187 of the brake pad 183, or the front end of the brake piston 110 may removeably or selectively engage with the support bracket 187 once the brake piston 110 moves into contact with the support bracket 187. The pocket of the brake piston 110 may be keyed (e.g., threaded) and may engage with a mating, keyed (e.g., threaded) spindle nut or spindle of a spindle/nut assembly (such as 130).

The brake system 100 may be, for example, but not limited to, a combined service and parking brake apparatus.

Functioning as a service brake of a vehicle, the brake system 100 may be operated by means of hydraulics. Pressurized hydraulic fluid is supplied to a fluid chamber 180, which is connected to a hollow inner region (e.g. a bore 116) of the brake piston 110. The brake piston 110 may be a hollow-cylindrical component, which is closed in pressure-fluid-tight fashion on one of its ends. In the event of a pressure increase in the fluid chamber 180, the brake piston 110 is moved in a direction toward the rotor 186, in order to place the brake pads 183 against the rotor 186.

The brake system 100 also includes a parking brake part or assembly, which may include a spindle/nut assembly 130 and an actuator 190. For example, the parking brake may be a so-called MOC (motor on caliper) type, in which a driver or operator request to actuate the parking brake is transmitted by means of an electrical signal to a controller, which operates a motor 196 in order to mechanically engage the parking brake. The brake caliper 102 of the brake system 100 is tightened and mechanically locked in place.

For rotationally driving the spindle/nut assembly 130, it is possible to use, for example, an electric motor, which is capable of transmitting its rotary motion to a spindle or a spindle nut of the spindle/nut assembly by means of an output shaft formed in a complementary manner to the rotary connection. According to the embodiment of the present disclosure, the actuator 190 is coupled to the spindle/nut assembly 130 to provide rotation force. The actuator 190 may comprise the motor 196. For example, the electric motor 196 is embodied as a DC motor.

The actuator 190 may optionally include a transmission 193. The transmission 193 may be located between the spindle/nut assembly 130 and the motor 196 so that the torque generated by the motor 196 can be increased or decreased before the torque is communicated to the spindle/nut assembly 130. For example, an output of the transmission 193 is coupled to a rear section of the spindle 133 and the transmission 193 rotates the spindle 133. The transmission 193 may include one or more gears, such as, but not limited to, a sun gear, a ring gear, a planet gear, and any type of appropriate gears. The present disclosure is not restricted to driving the spindle/nut assembly 130 in a rotatable manner by means of a geared motor unit with an electric motor and a reduction gear. As an alternative, the spindle/nut assembly 130 may be driven in a rotatable manner by a belt, or by a mechanism of transmission by a lever(s), by cable or similar transmission mechanism. In another embodiment of the present disclosure, the actuator 190 may not include the transmission 193, and the driving shaft of the electric motor 196 may be directly coupled to the rear section of the spindle/nut assembly 130.

Figure 2:
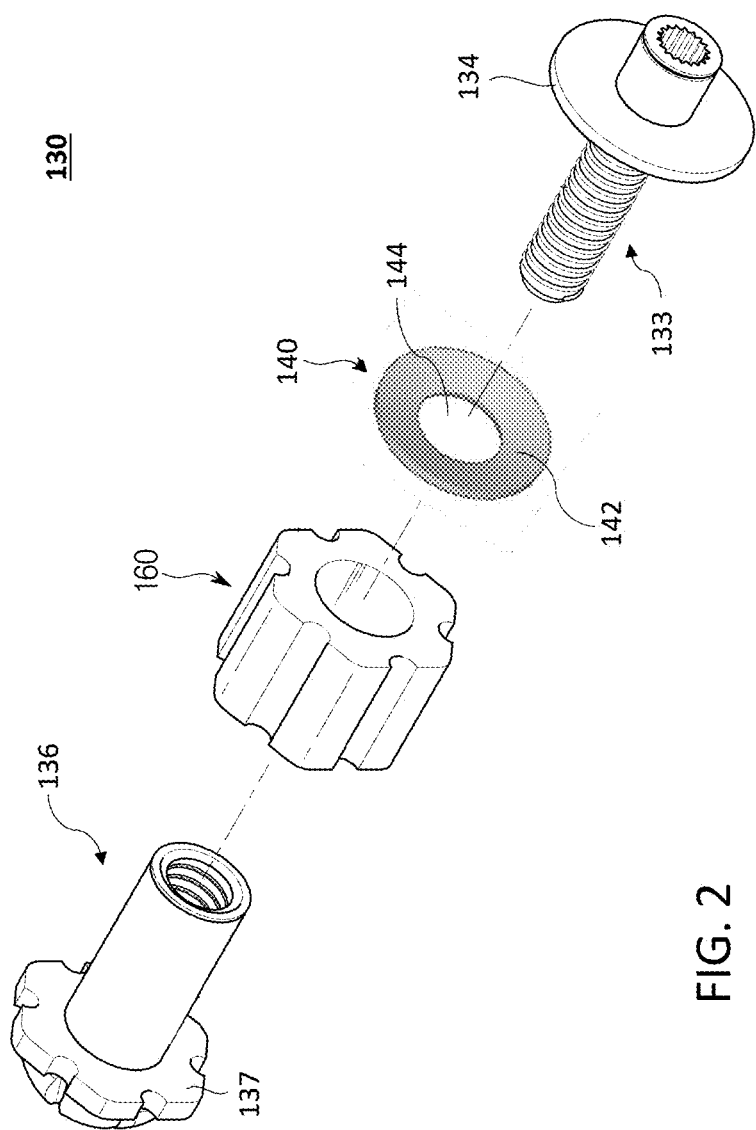
FIG. 2 is an exploded view of a spindle/nut assembly of a brake system according to an exemplary embodiment of the present disclosure.
Figure 3:
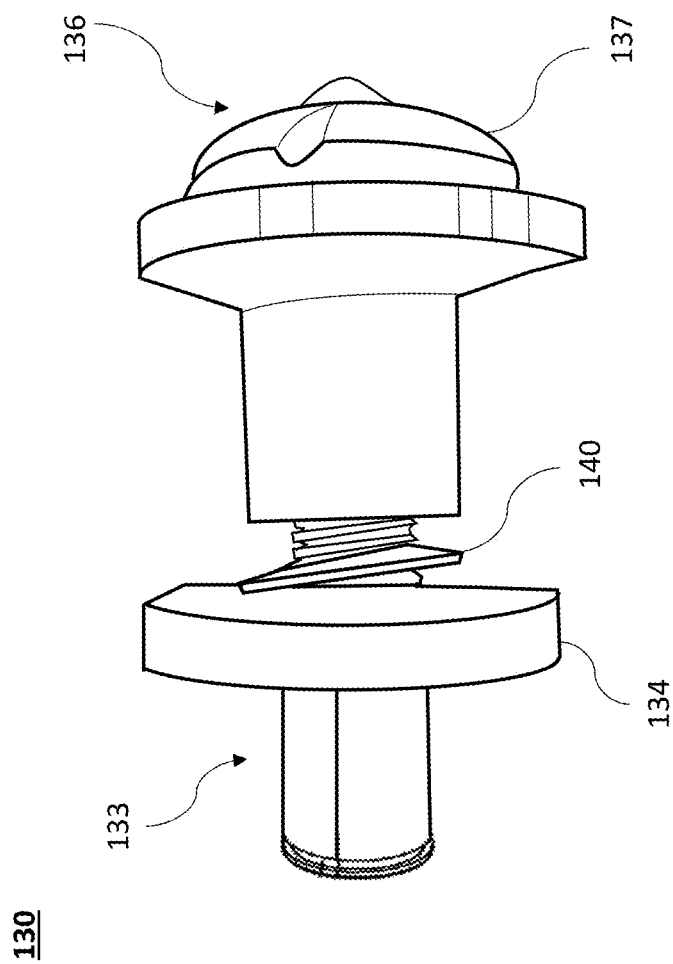
FIG. 3 is a perspective view of a spindle/nut assembly of a brake system according to an exemplary embodiment of the present disclosure.
Figure 10:
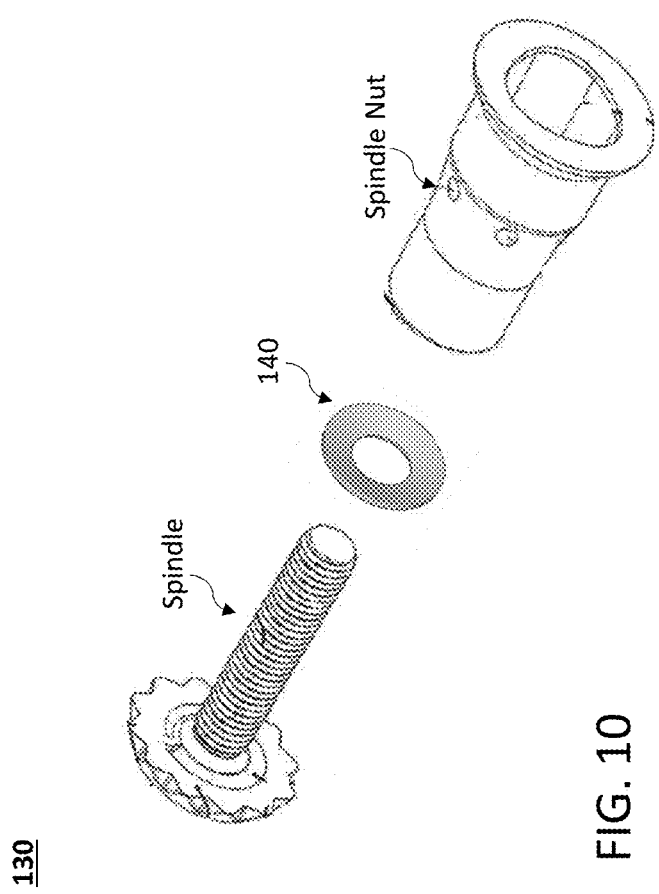
FIG. 10 shows an exploded view of a spindle/nut assembly of a brake system according to still another embodiment of the present disclosure.

The spindle/nut assembly 130 is configured to convert the rotation force provided by the actuator 190 to a linear or translatory movement in order in this manner to move the brake piston 110 toward the rotor 186 and press the brake pads 183 against the rotor 186. The spindle/nut assembly 130 may comprise a spindle and a spindle nut. FIGS. 1-3 illustrate an example where one spindle/nut assembly element 133 positioned adjacent to the actuator 190 is a spindle and another spindle/nut assembly element 136 located adjacent to the brake piston 110 is a spindle nut. However, the spindle/nut assembly 130 according to the present disclosure is not limited to this arrangement or any particular type spindle/nut assembly, and other type designs of the spindle/nut assembly may be chosen as those of skill in the art will recognize. For example, as shown in FIG. 10, the one spindle/nut assembly element 133 can be implemented as a spindle nut and the other spindle/nut assembly element 136 can be implemented as a spindle.

The spindle nut 136 may operably engage with the brake piston 110 so that one or more brake pads 183 can move relative to the rotor 186 to create and/or release a brake apply (i.e. a parking brake force). The spindle nut 136 may engage with the brake piston 110 via any suitable engagement or attachment. For example, the engagement may be a threaded engagement, a sliding engagement, an interference engagement, a permanent engagement, a removable engagement, a keyed engagement, the like, or a combination thereof. The spindle nut 136 may be at least partially received into the bore 116 of the brake piston 110. A moving force supplied through the spindle 133 from the actuator 190 may be applied to the spindle nut 136 so that the brake piston 110 can move along a piston axis relative to the brake pad 183. The spindle nut 136 may at least partially move relative to the piston bore 116 without the brake piston 110 and/or the brake pads 183 actually moving relative to the rotor 186 (i.e., a gap may extend between the spindle nut 136 and the piston bore 116). In other words, the spindle nut 136 may be moved axially within the piston bore 116 a certain distance before the spindle nut 136 actually moves the piston 110 and/or the brake pad 183. The spindle nut 136 may be translated along a piston axis within the piston bore 116, rotated within the piston bore 116, or a combination thereof to move the piston 110, the brake pad 183, or both relative to the rotor 186. More specifically, the spindle nut 136 may be translated or rotated in a first direction (i.e., in an unlocking direction) to move or advance the brake pad 183 towards the rotor 186 to create the brake apply. And, the spindle nut 136 may be translated or rotated in an opposing direction (i.e., in a locking direction) to move the brake pad 183 away from the rotor 186 to release the brake apply. In some embodiments of the present disclosure, it is envisioned that the spindle nut may be integrally formed with the brake piston, the spindle, or a combination thereof.

The spindle 133 may operably engage with the spindle nut 136. The spindle 133 may be in communication with the actuator 190, and may cooperate with the spindle nut 136 to translate a rotational force received from the actuator 190 into a linear force to move the brake piston 110 along the piston axis. The spindle 133 may engage with the spindle nut 136, via any suitable engagement or attachment for performing the aforementioned functions/operations. For example, the engagement may be a threaded engagement. For this, each of the spindle 133 may include one or more threaded portions. The spindle 133 may be rotated or translated in a first direction (i.e., in an unlocking direction) to move the spindle nut 136, the brake piston 110, and/or the brake pad 183 towards the rotor 186 to create the brake apply. And, the spindle 133 may be rotated or translated in an opposing direction (i.e., in a locking direction) to move the spindle nut 136, the brake piston 110, and/or the brake pad 183 away from the rotor 186 to release the brake apply. Again, it is within the scope of this disclosure that the spindle, the spindle nut and/or the brake piston may be a single component.

In operation, to create parking brake force, the motor 196 is configured to generate torque that causes the spindle 133 to rotate in an apply direction. The rotation of the spindle 133 in the apply direction causes the spindle nut 136 to move axially in an apply direction toward the brake piston 110. When the spindle nut 136 is screwed out of the spindle 133 as a result of rotation thereof, the front side of the nut head 137 comes into contact with the inner side of a head 113 of the brake piston 110. After the spindle nut 136 engages the inner side of the head 113 of the brake piston 110, further rotation of the spindle 133 causes the spindle nut 136 to axially move the brake piston 110 and thus the brake pads 183 against the rotor 186. In exemplary embodiments of the present disclosure, the front side of the spindle nut head 137 and the inner side of the piston head 113 may be formed in a complementary manner in terms of their shape, so that the nut head 137 can be applied over a large area and hence in a material sparing manner against the brake piston 110, thereby allowing good transmission of high locking forces.

To release parking brake force that is locked as a result of increasing the length of the spindle/nut arrangement 130, the motor 196 may generate a torque that causes the spindle 133 to rotate in a release direction. The release direction may be a direction opposite to the apply direction. The rotation of the spindle 133 causes the spindle nut 136 to move in the release direction. The spindle nut 136 is then screwed back into the spindle 133 and the spindle nut head 137 detaches from the inner side of the piston head 113, with the result that there is no longer any locking force transmitted to the brake piston 110. Accordingly, the brake piston 110 moves away from the inboard brake pad 183 and the inboard brake pad 183 moves away from the rotor 186 thus releasing the clamp force.

However, the linear movement of the spindle nut 136 toward the spindle 133 needs to be stopped at a certain position.

Figure 4:
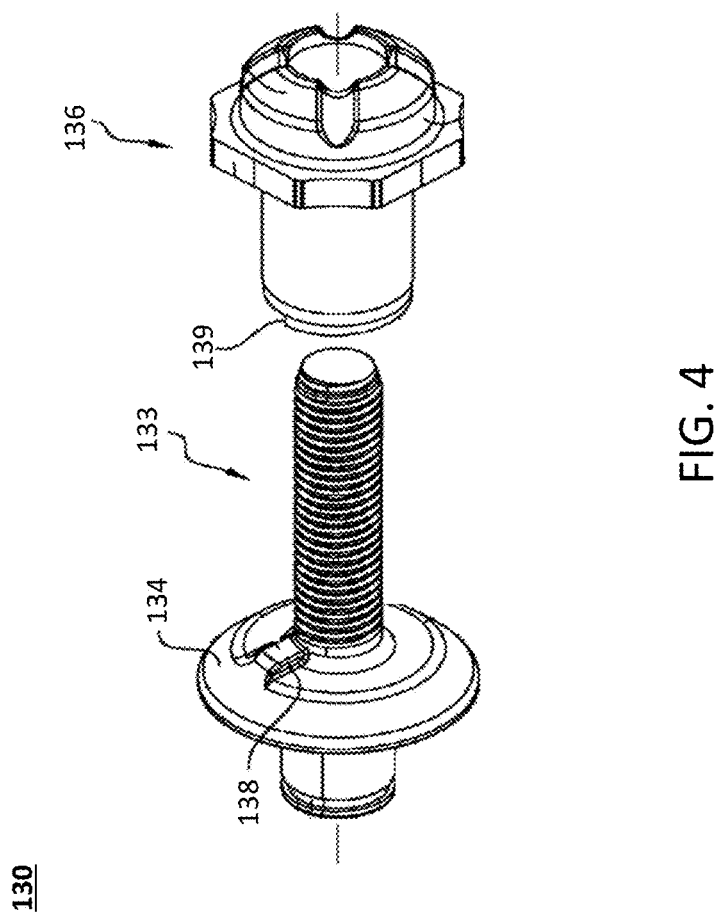
FIG. 4 is an exploded view of a spindle/nut assembly of a brake system according to another exemplary embodiment of the present disclosure.

For example, as shown in FIG. 4, for stopping or limiting the movement of the spindle nut 136 toward the spindle 133, a stop flange 134 of the spindle 133 may have a tooth 138 projecting axially toward the front part of the spindle 133 from the front surface of the flange 134, and the spindle nut 136 may have a notch 139 formed at a rear end of the spindle nut 136. When the notch 139 of the spindle nut 136 being screwed back into the spindle 133 contacts the tooth 138 formed on the flange 134 of the spindle 133, the linear movement of the spindle nut 136 toward the spindle 133 can be stopped. However, this hard stop mechanism can produce noise and have limited design life.

According to embodiments of the present disclosure, either or both the tooth 138 formed on the flange 134 of the spindle 133 and/or the notch 139 of the spindle nut 136 can be removed. Instead, to provide a soft stop to the fully released position of the spindle nut 136, a disc type spring 140 can be disposed and act between the spindle 133 and the spindle nut 136. The disc type spring 140 may be configured to provide a linear deflection force. For instance, the disc type spring 140 may be configured to provide resilient force against the linear movement of the spindle nut 136 toward the spindle 133 due to elastic deformation. Accordingly, the disc type spring 140 can prevent the hard stop of the spindle nut 136 to the spindle 133.

In the exemplary embodiment of the present disclosure, the disc type spring 140 can be positioned between an end of the spindle nut 136 facing the spindle 133 and a projecting part or protrusion 134 of the spindle 133. The projecting part or protrusion 134 of the spindle 133 may have a structure projecting or protruding from a circumferential surface of the spindle 133 in a radial direction. The projecting part or protrusion 134 may be implemented as, for example, but not limited to, a stop flange which may be a projecting flat rim, collar, or rib on an object. The projecting part 134 of the spindle 133 may be configured to support the disc type spring 140 and stop or limit the linear movement of the spindle nut 136 relative to the spindle 133 when a part of the spindle nut 136 (e.g. one end of the spindle nut 136 facing the spindle 133) moving toward the spindle 133 reaches the protrusion part 134 of the spindle 133.

For example, when the locked vehicle brake is released, the spindle nut 136 is screwed back into the spindle 133 and moved away from the brake piston 110. When a part of the spindle nut 136 (e.g. one end of the spindle nut 136 facing the spindle 133) is being moved close to the projecting part 134 of the spindle 133, the disc type spring 140 acts against the part of the spindle nut 136 so that the spindle nut 136 moving toward the spindle 133 can be softly stopped with respect to the spindle 133.

Figure 5D:
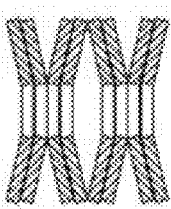
FIGS. 5A-5D show examples of disk type springs for a spindle/nut assembly of a brake system according to exemplary embodiments of the present disclosure.
Figure 5C:
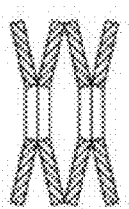
Figure 5B:
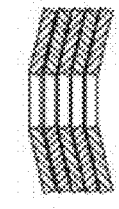
Figure 5A:
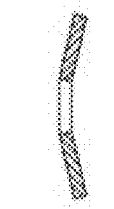

The disc type spring 140 can comprise a curved plate 142 radially surrounding a central opening 144 formed therein. The spindle 133 can be disposed in the central opening 144 of the disc type spring 140. For example, the disc type spring 140 comprises one or more washers. The disc type spring 140 can be a single washer. An example of the single washer is illustrated in FIG. 5A. Alternatively, the disc type spring 140 can have the plurality of stacked washers, such as washers stacked in parallel (facing the same direction, See FIG. 5B), washers stacked in series (facing in alternating directions, See FIG. 5C), and washers stacked in series and parallel in combinations (See FIG. 5D)).

Figures 6A, 6B, 6C:
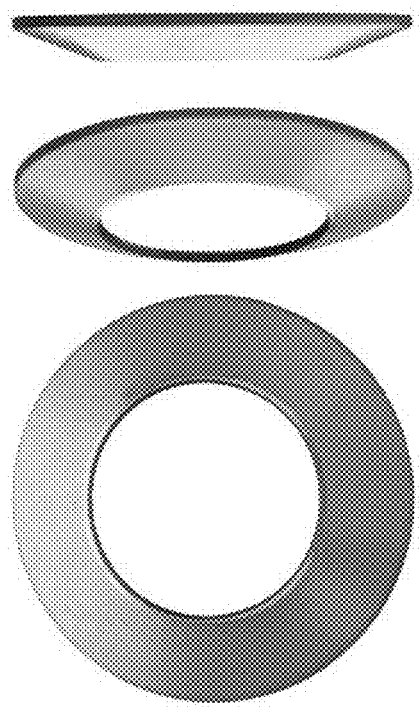
FIGS. 6A-6C illustrate top, perspective and side views of an example of a disk type spring for a spindle/nut assembly of a brake system according to another exemplary embodiment of the present disclosure.

In a first exemplary embodiment, the disc type spring 140 comprises one or more Belleville washers. FIGS. 6A-6C show top, perspective and side views of an example of the Belleville washer. However, the present disclosure is not limited thereto and various types of Belleville washers can be applied to the present disclosure.

In a second exemplary embodiment, the disc type spring 140 comprises a washer curved asymmetrically. For example, as shown in FIGS. 1 and 3, one point of the washer 140 can be curved toward a first direction (e.g. a direction toward the spindle 133) and another point of the washer 140 can be curved toward a second direction (e.g. a direction toward the spindle nut 136) so that the washer 140 can be positioned angularly with respect to a surface of the projecting part 134 of the spindle 133 facing the washer 140 and/or a surface of the spindle nut 136 that can contact the washer 140. In this example, in the uncompressed status, the washer 140 can be disposed not parallel to a surface of the projecting part 134 of the spindle 133 facing the washer 140 and/or a surface of the spindle nut 136 that can contact the washer 140.

Figure 7B:
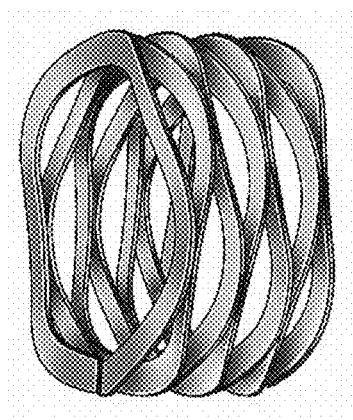
Figure 7A:
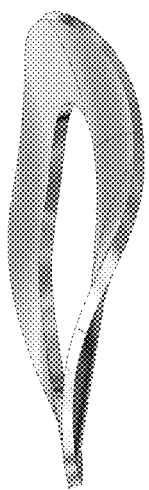

In a third exemplary embodiment, the disc type spring 140 comprises a wave washer having a wave shape in an axial direction of the spindle/nut assembly 130. FIG. 7A illustrates a perspective view of an example of a single wave washer. FIG. 7B illustrates a perspective view of an example of the plurality of stacked wave washers.

Figure 8:
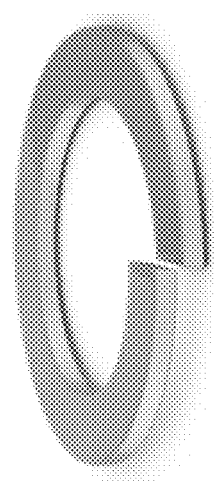
FIGS. 7A-7B and 8 show perspective views of examples of disk type springs for a spindle/nut assembly of a brake system according to still another exemplary embodiments of the present disclosure.

In a fourth exemplary embodiment, the disc type spring 140 comprises a washer having a helical shape split at one point. FIG. 8 shows a perspective view of an example of the split washer.

Figures 9A, 9B, 9C:
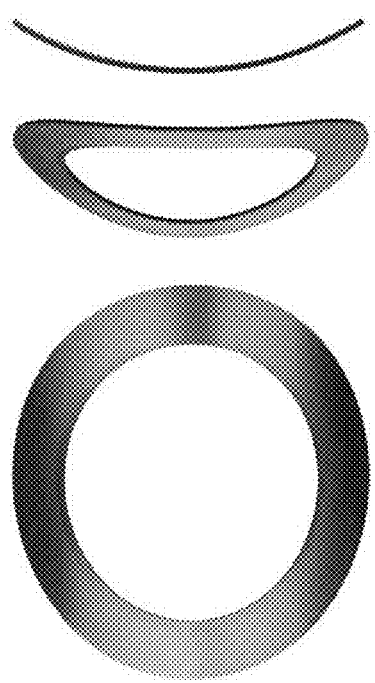
FIGS. 9A-9C illustrate top, perspective and side views of an example of a disk type spring for a spindle/nut assembly of a brake system according to still another embodiment of the present disclosure.

In a fifth exemplary embodiment, the disc type spring 140 comprises a washer symmetrically curved in an axial direction of the spindle/nut assembly 130. FIGS. 9A-9C show top, perspective and side views of an example of the symmetrically curved washer.

Various other disc type spring can be used as well including any disc spring having resilient characteristic or any disc spring including any combination of washers described above.

The spindle/nut assembly 120 may further include a spacer 160. The spacer 160 may be disposed on a rod of the spindle nut 136 and/or spindle 133. The spacer 160 occupies a desired amount of space in the piston bore 116 to reduce the amount of the fluid requiring for applying the brake. The disc type spring 140 may be disposed between the spacer 160 and the spindle 133. For instance, the disc type spring 140 is disposed between one end of the spacer 160 facing the spindle 133 and a surface of the projecting part 134 of the spindle 133 facing the spindle nut 136.

According to some embodiments of the present disclosure, the disc type spring 140 may prevent the hard stop of the brake piston 110 to the spindle/nut assembly 130 and provide a soft stop. The disc type spring 140 may decrease a shock to the brake system 100, increase the durability of the spindle/nut assembly 130, and decrease the cost of the brake system 100.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A brake system, comprising:
a caliper housing having a bore formed therein;
a brake piston slidably positioned in the bore of the caliper housing; and
a spindle/nut assembly associated with the brake piston, the spindle/nut assembly comprising:
a spindle;
a spindle nut operably engaged with the spindle; and
a disc type spring comprising a curved plate radially surrounding the spindle, wherein the disc type spring is disposed between the spindle nut and the spindle to provide a resilient force between the spindle nut and the spindle.

2. The brake system of claim 1, wherein the disc type spring is positioned between an end of the spindle nut and a projecting part of the spindle.

3. The brake system of claim 2, wherein the projecting part of the spindle comprises a flange formed or positioned on the spindle.

4. The brake system of claim 1, wherein the disc type spring is configured to provide the resilient force against a movement of the spindle nut toward the spindle.

5. The brake system of claim 1, wherein the spindle is configured to be rotatably driven and the spindle nut is configured to be movable in a linear direction in response to a rotation movement of the spindle.

6. The brake system of claim 1, wherein the spindle nut is configured to be rotatably driven and the spindle is configured to be movable in a linear direction in response to rotation of the spindle nut.

7. The brake system of claim 1, wherein the disc type spring comprises one or more washers.

8. The brake system of claim 1, wherein the disc type spring comprises a Belleville washer.

9. The brake system of claim 1, wherein the disc type spring comprises a washer having a wave shape in an axial direction of the spindle/nut assembly.

10. The brake system of claim 1, wherein the disc type spring comprises a washer having a helical shape split at one point.

11. The brake system of claim 1, wherein the disc type spring comprises a curved washer.

12. The brake system of claim 11, wherein the curved washer is curved in an axial direction of the spindle/nut assembly.

13. The brake system of claim 1, wherein the disc type spring comprises a plurality of curved washers stacked on each other.

14. The brake system of claim 1, wherein:
the spindle comprises a flange, and
the disc type spring is positioned between an end of the spindle nut facing the spindle and a surface of the flange of the spindle facing the spindle nut.

* * * * *